United States Patent [19]

Hirano et al.

[11] Patent Number: 6,002,977
[45] Date of Patent: Dec. 14, 1999

[54] CONTROL SYSTEM FOR AUTOMATIC TRANSMISSION FOR VEHICLE

[75] Inventors: Masamitsu Hirano; Yoichi Sato, both of Wako, Japan

[73] Assignee: Honda Giken Kogyo Kabushiki Kaisha, Tokyo, Japan

[21] Appl. No.: 08/982,380

[22] Filed: Dec. 2, 1997

[30] Foreign Application Priority Data

Dec. 6, 1996 [JP] Japan .................................... 8-327015

[51] Int. Cl.$^6$ .................................................. F16H 61/06
[52] U.S. Cl. ................................ 701/65; 701/66; 477/120
[58] Field of Search .................................. 701/51, 64, 65, 701/66; 477/143, 154, 120

[56] References Cited

U.S. PATENT DOCUMENTS 5,839,083  11/1998  Sugiyama ................................... 701/62

FOREIGN PATENT DOCUMENTS 64-7259  2/1989  Japan .

Primary Examiner—Tan Nguyen
Attorney, Agent, or Firm—Armstrong, Westerman, Hattori, McLeland & Naughton

[57] ABSTRACT

A control system for a vehicle with an automatic transmission adapted to prohibit the upshifting from a second shift stage to a third shift stage upon generation of a slipping of driven wheels. When an accelerator pedal is depressed to increase the throttle opening degree TH in order to permit the vehicle to be started to travel on an icy surface and the like having a lower road surface friction coefficient, the vehicle speed V detected based on the number of rotations of an output shaft of an automatic transmission is rapidly increased due to the generation of a slipping, whereby the upshifting from the second shift stage to the third shift stage is prohibited. A vehicle speed generated on a usual flat road is previously stored, and a presumed vehicle speed VYS is calculated from such vehicle speed and a time elapsed after the generation of the slipping. When the detected vehicle speed V becomes equal to or less than the presumed vehicle speed VYS, it is determined that the gripping between the driven wheels and a road surface has been restored, and the prohibition of the upshifting is canceled. Thus, it is possible to properly perform the canceling of the prohibition of the upshifting.

5 Claims, 11 Drawing Sheets

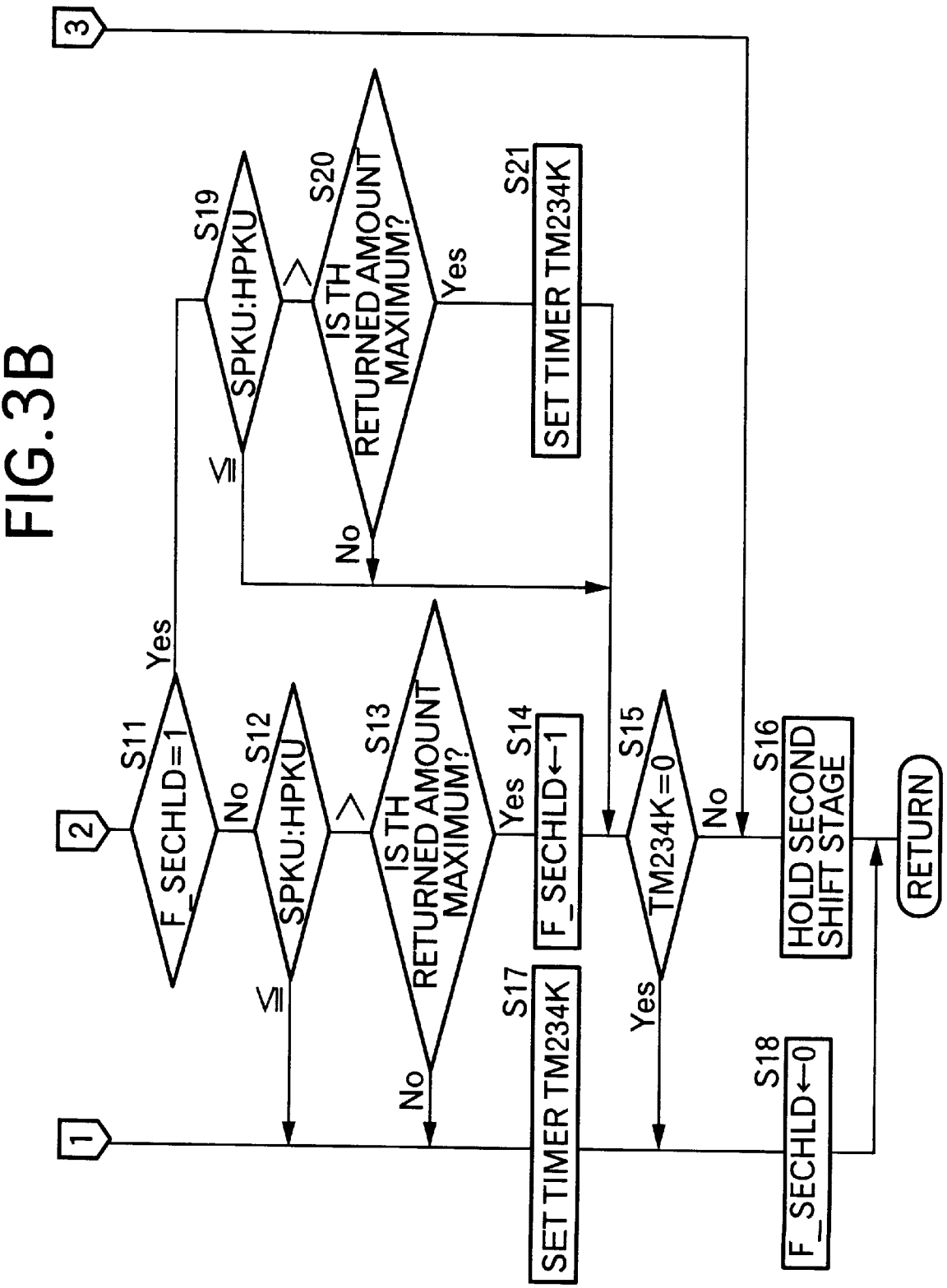

CONTROL SYSTEM FOR AUTOMATIC TRANSMISSION FOR VEHICLE

BACKGROUND OF THE INVENTION

1. Field of the Invention

The present invention relates to a control system for an automatic transmission for a vehicle, and more particularly, to a control system for an automatic transmission for a vehicle which is designed such that when the slipping of the driven wheels of the vehicle has been determined, the shifting of the automatic transmission is prohibited.

2. Description of the Related Art

If driven wheels are slipped when a vehicle provided with a vehicle speed detecting means for detecting a vehicle speed based on a rotational speed of a rotary member of the automatic transmission starts to travel on an icy surface having a smaller friction coefficient, the rotational speed of the rotary member is increased. Therefore, the vehicle speed detecting means detects a higher vehicle speed, but an actual vehicle speed remains lower, because of a loss in grip between the driven wheels and a road surface. In this case, because the vehicle speed detecting means detects the higher vehicle speed, there is a possibility that the automatic transmission is upshifted, and as a result the number of rotations of the driven wheels is further increased to exert a negative influence on the durability of a differential or the like.

There is a well-known control system disclosed in Japanese Patent Publication No. 64-7259 which is designed so that when the rotational acceleration of the rotary member of the automatic transmission becomes equal to or greater than a predetermined value, it is determined that the driven wheels are in their slipped states, and upshifting is prohibited based on this determination.

In the control system for the automatic transmission provided with such shift prohibiting means, if the canceling of the prohibition of the upshifting is not properly performed, there is a possibility that the prohibition of the upshifting is continued even after elimination of the slipping, or the prohibition of the upshifting is canceled before elimination of the slipping.

SUMMARY OF THE INVENTION

Accordingly, it is an object of the present invention to ensure that the restoring of the gripping between the driven wheels and the road surface as a result of the elimination of the slipping of the driven wheel can be detected with a good accuracy to properly cancel the prohibition of the shifting.

To achieve the above object, according to a first aspect and feature of the present invention, there is provided a control system for an automatic transmission for a vehicle, comprising a shift control means for changing the shift stage of the automatic transmission in accordance with the operational state of the vehicle, a vehicle speed detecting means for detecting a vehicle speed based on a rotational speed of a rotary member of the automatic transmission, a slipped-state determining means for determining a slipped state of the vehicle based on a rate of variation in vehicle speed detected by the vehicle speed detecting means, and a shift prohibiting means for prohibiting the shifting of the automatic transmission by the shift control means when the slipped state is detected by the slipped-state determining means. The control system further includes a vehicle acceleration (during traveling on flat road) calculating means for calculating a vehicle acceleration on a flat road from a throttle opening degree or an accelerator opening degree and the vehicle speed calculated by the vehicle speed calculating means at a shift stage at the time point when the slipped state is determined by the slipped-state determining means, an elapsed-time measuring means for measuring a time which elapses from the time point when the slipped state is determined by the slipped-state determining means, a presumed-vehicle speed calculating means for calculating a presumed vehicle speed from (1) an amount of variation in vehicle speed which corresponds to an elapsed time measured by the elapsed-time measuring means and which is calculated from the vehicle speed calculated by the vehicle acceleration (during traveling on flat road) calculating means and the elapsed time, and (2) a vehicle speed at the time point when the slipped state is determined by the slipped-state determining means, a slipped-state elimination determining means for determining the elimination of the slipped state by comparing the vehicle speed detected by the vehicle speed detecting means with the presumed vehicle speed calculated by the presumed vehicle speed calculating means, and a shift prohibition canceling means for canceling the prohibition of the shifting by the shift prohibiting means when the elimination of the slipped state is determined by the slipped-state elimination determining means.

With the above arrangement, the vehicle acceleration (during traveling on flat road) calculating means calculates the vehicle acceleration on a flat road surface from the throttle opening degree or the accelerator opening degree and the vehicle speed calculated by the vehicle speed calculating means at a shift stage at the time point when the slipped state is determined by said slipped-state determining means, and the elapsed-time measuring means measures the time which elapses from the time point when the slipped state is determined by the slipped-state determining means. The presumed vehicle speed calculating means calculates the presumed vehicle speed from (1) the amount of variation in vehicle speed which corresponds to the elapsed time and which is calculated from the vehicle acceleration and the elapsed time, and (2) the vehicle speed at the time when the slipped state is determined. The slipped-state elimination determining means determines the elimination of the slipped state by comparing the vehicle speed with the presumed vehicle speed, and the shift prohibition canceling means cancels the prohibition of the shifting by the shift prohibiting means, when the elimination of the slipped state is determined. Thus, the prohibition of the shifting is properly canceled upon the elimination of the slipped state and hence, the prohibition of the shifting is prevented from being continued after elimination of the slipped state, and from being canceled before elimination of the slipped state.

According to a second aspect and feature of the present invention, in addition to the first feature, when the throttle opening degree or the accelerator opening degree is decreased to a closed value for a predetermined time, the shift prohibition canceling means cancels the prohibition of the shifting.

With the above feature, when the throttle opening degree is decreased to the closed value to eliminate the slipped state, the prohibition of the shifting can be reliably canceled.

According to a third aspect and feature of the present invention, in addition to the first feature, when the throttle opening degree or the accelerator opening degree is decreased to a closed value before determination of the slipped state of the vehicle by the slipped-state determining means, the shift prohibiting means prohibits the shifting for a predetermined time from such time point.

With the above feature, it is possible to prevent the undesirable shifting produced before the slipped state is determined to start the prohibition of the shifting.

According to a fourth aspect and feature of the present invention, in addition to the first feature, when the throttle opening degree or the accelerator opening degree is decreased to the closed value during prohibition of the shifting, the shift prohibiting means continues the prohibition of the shifting for a predetermined time from such time point.

With the above feature, it is possible to prevent the undesirable shifting produced when the throttle opening degree is decreased to the closed value after being continuously increased to an opened value.

According to a fifth aspect and feature of the present invention, in addition to the first feature, when the throttle opening degree or the accelerator opening degree is maintained at a value equal to or smaller than a predetermined opening degree during prohibition of the shifting, the presumed vehicle speed calculating means corrects the presumed vehicle speed.

With the above feature, it is possible to avoid the undesirable canceling of the prohibition of the shifting during prohibition of the shifting at a smaller throttle opening degree.

The above and other objects, features and advantages of the invention will become apparent from the following description of the preferred embodiment in conjunction with the accompanying drawings.

BRIEF DESCRIPTION OF THE DRAWINGS

FIGS. 1 to 13 illustrate a preferred exemplary embodiment of the present invention, wherein:

FIG. 1 is an illustration of the entire arrangement of a vehicle equipped with a control system for an automatic transmission for a vehicle;

FIG. 2 is a block diagram of a control section;

FIGS. 3A and 3B are flow charts of a main routine;

FIG. 4 is a flow chart of an on-ice determining routine;

FIG. 5 is a flow chart of an acceleration difference calculating routine;

FIG. 6 is a flow chart of a presumed vehicle speed calculating routine;

FIG. 7 is a time chart for explaining the start of holding of a second shift stage due to a slipping;

FIG. 8 is a time chart for explaining the cancel of holding of the second shift stage due to abatement of slipping;

FIG. 9 is a time chart for explaining the cancel of holding of a second shift stage due to a full closing of a throttle;

FIG. 10 is a time chart for explaining the suppression of canceling of the holding of the second shift stage by a second shift stage hold canceling delay timer TMHYJG;

FIG. 11 is a time chart for explaining the suppression of canceling of the holding of the second shift stage by a second shift stage (before on-ice determination) holding timer TM234K;

FIG. 12 is a time chart for explaining the suppression of canceling of the holding of the second shift stage when at a smaller throttle opening degree; and FIG. 13 is a time chart for explaining the operation when the shifting is conducted from an R range to a D range.

DETAILED DESCRIPTION OF THE PREFERRED EXEMPLARY EMBODIMENT

The present invention will now be described by way of a preferred exemplary embodiment with reference to FIGS. 1 to 13.

Figure 1:
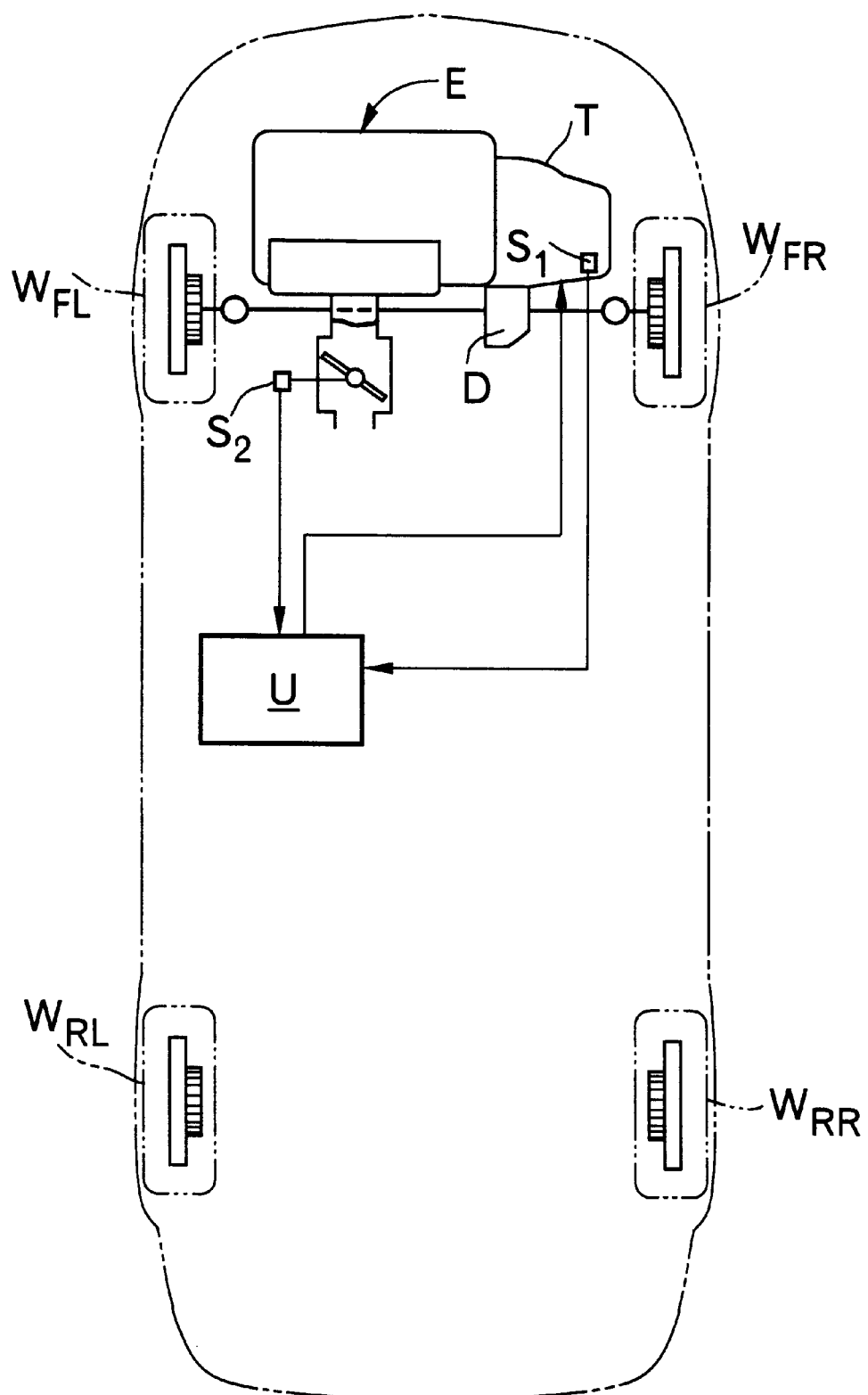

Referring to FIG. 1, a front engine front driven vehicle includes a left and right driven wheels $W_{FL}$ and $W_{FR}$ driven by an engine E through an automatic transmission T and a differential D, and left and right follower wheels $W_{RL}$ and $W_{RR}$ which rotate along with the traveling of the vehicle. Inputted to an electronic control unit U are a signal from a vehicle speed sensor $S_1$ for detecting a vehicle speed V based on a number of revolutions of a rotary member (e.g., an output shaft) of the automatic transmission T, and a signal from a throttle opening degree sensor $S_2$ for detecting a throttle opening degree TH which is an opening degree of a throttle valve provided in an intake passage in the engine E. The electronic control unit U controls the shifting of the automatic transmission T based on the signals from the vehicle speed sensor $S_1$ and the throttle opening degree sensor $S_2$.

Figure 2:
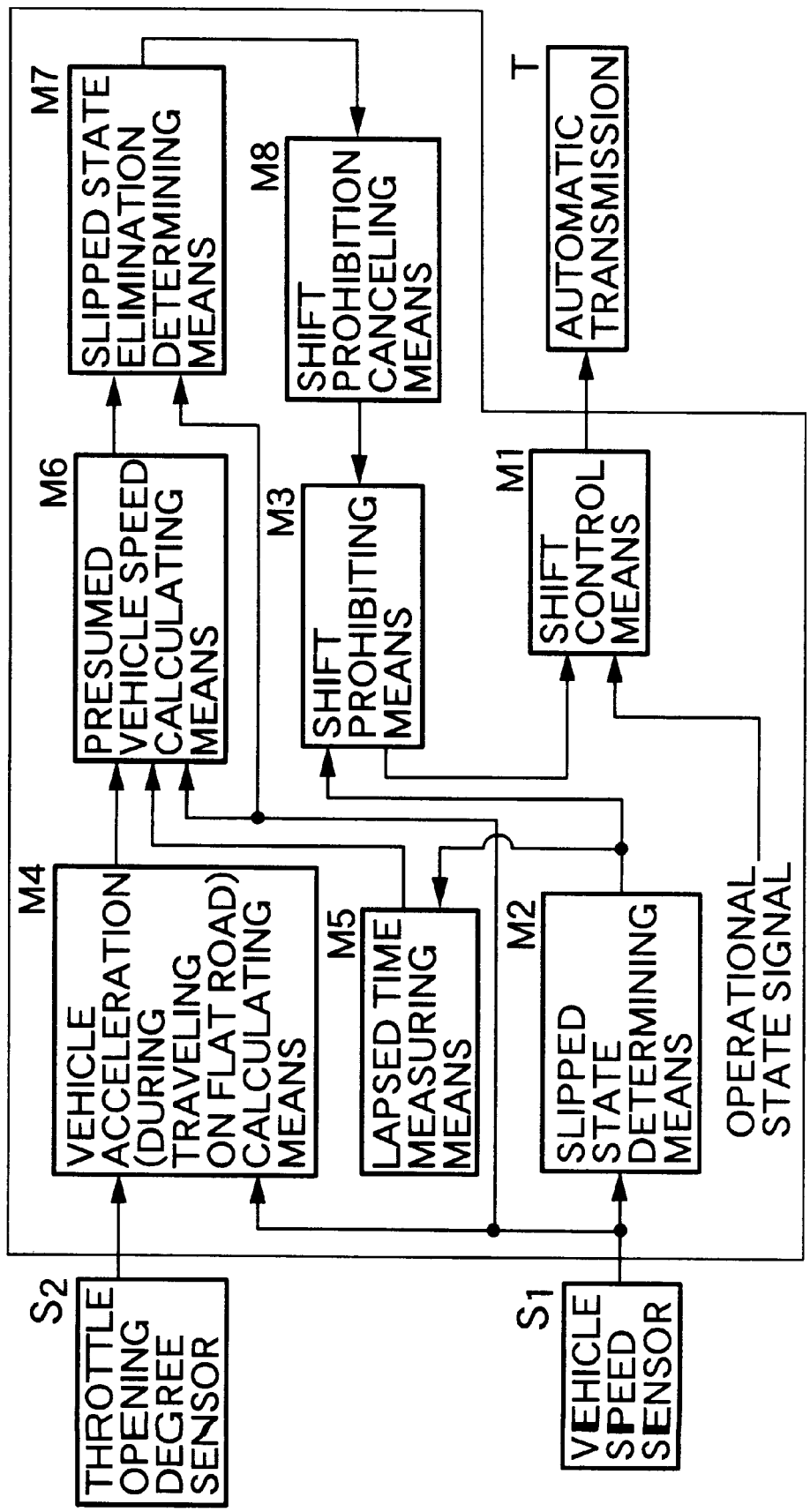

As shown in FIG. 2, the electronic control unit U includes a shift control means M1, a slipped-state determining means M2, a shift prohibiting means M3, a vehicle body acceleration (during traveling on a flat road) calculating means M4, an elapsed-time measuring means M5, a presumed-vehicle speed calculating means M6, a slipped-state elimination determining means M7 and a shift prohibition canceling means M8.

The shift control means M1 controls the shifting of the automatic transmission T based on signals indicative of operational states such as a number of revolutions of the engine, an internal absolute pressure in an intake pipe, a vehicle speed, a throttle opening degree, a shift stage and the like. The slipped-state determining means M2 determines a slipped state of the driven wheels $W_{FL}$ and $W_{FR}$ based on a rate of variation in vehicle speed V detected by the vehicle speed sensor $S_1$. The shift-prohibiting means M3 prohibits the upshifting of the automatic transmission T by the shift control means M1 to hold the shift stage at a second shift stage, when the slipped state of the driven wheels $W_{FL}$ and $W_{FR}$ has been determined.

The vehicle body acceleration (during traveling on a flat road) calculating means M4 calculates a vehicle acceleration on a flat road based on a vehicle speed V detected by the vehicle speed sensor $S_1$, a throttle opening degree TH detected by the throttle opening degree sensor $S_2$, and a map which will be described hereinafter. The elapsed-time measuring means M5 measures a time which elapses from time point of determination of the slipped state by the slipped-state determining means M2. The presumed-vehicle acceleration calculating means M6 calculates an amount of variation in vehicle speed corresponding to the time elapsing from the vehicle acceleration and the elapsed time, and calculates a presumed vehicle speed VYS from the amount in variation in vehicle speed and from a vehicle speed V at the time point of determination of the slipped state.

The slipped-state elimination determining means M7 determines the elimination of the slipped state by comparing the vehicle speed V and the presumed vehicle speed VYS with each other. The shift-prohibition canceling means M8 cancels the prohibition of shifting by the shift prohibiting means M3 and permits the upshifting from the second shift stage, when the elimination of the slipped state is determined.

The operation of the embodiment of the present invention having the above-described arrangement will be described below in further detail with reference to flow charts in FIGS. 3A to 6.

Prior to the description, the contents of characters used in the flow charts will be described below.

Labels

SPKU: Difference between accelerations

HPKU: On-ice determination constant

VHYJL: Lower limit vehicle speed during holding of second shift stage

VHYJH: Upper limit vehicle speed during holding of second shift stage

HVYSH: Upper limit value of presumed vehicle speed $V_0$: Vehicle speed at start of slipping VYS Presumed vehicle speed ΔVYS Rate in variation in presumed vehicle speed GGHH: Reference acceleration during traveling of the vehicle at the second shift stage on the flat road GGFH: Acceleration ratio resulting from division of the reference acceleration during traveling of the vehicle at the second shift stage on the flat road by a reference acceleration during traveling at a first shift stage HDELVH: Actual acceleration TH: Throttle opening degree Timer TMA: On-ice determination timer TMTH: TH return timer TMHYJG: Second-stage-hold cancel delay timer TM234K: Second stage holding (before on-ice determination) timer Flag F_SLIP: Slip determining flag F_HYJ: On-ice determining flag F_THCL: Fully-closed throttle determining flag F_SECHLD: Second shift stage hold (out of on-ice) determining flag First, at step S1 of a main routine shown in FIG. 3A, it is determined whether the vehicle is on an ice-covered surface having a smaller road surface friction coefficient. If the vehicle is on such ice, the on-ice determining flag F_HYJ is set at "1", whereby the upshifting from the second shift stage to a third shift stage is inhibited. If the vehicle is not on such ice, the on-ice determining flag F_HYJ is cleared to "0", whereby such upshifting is permitted. The detail of step S1 will be described according to an on-ice determining subroutine shown in FIG. 4.

A description is first made of a case where it is determined that the vehicle is on the ice, and the on-ice determining flag F_HYJ is set at "1". If the shift stage is not the third shift stage or a fourth shift stage at step S31, and the on-ice determining flag F_HYJ is cleared to "0" at step S32, the TH return timer TMTH is set at step S33. If the vehicle speed V detected by the vehicle speed sensor $S_1$ is between a lower limit vehicle speed VHYJL during holding of the second shift stage (e.g., 5 km/h) and an upper limit vehicle speed VHYJH during holding of the second shift stage (e.g., 120 km/h) at step S34, the processing is advanced to step S35, at which it is determined whether the vehicle is on an icy surface having a smaller road surface friction coefficient.

Figure 7:
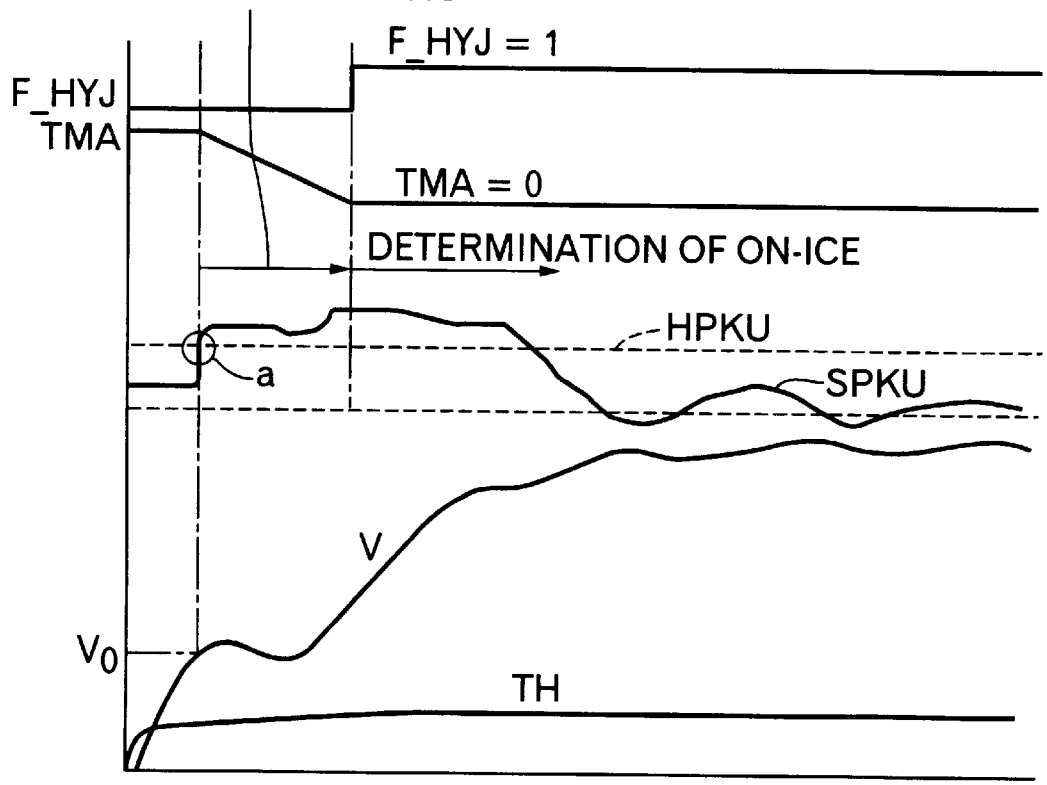

A description will be made with reference to FIG. 7 prior to the description according to the flow charts. If the driven wheels experience slipping on an icy surface when an accelerator pedal is depressed to start the vehicle, the driven wheel speed V is rapidly and unstably increased. At this time, if an acceleration difference SPKU between an acceleration of the vehicle on the ice and an acceleration of the vehicle which is traveling on a normal flat road exceeds a predetermined onice determining constant HPKU (e.g., a variation in vehicle speed of 2.9 km/h for 240 ms) at a point a, the on-ice determining timer TMA is started. If the acceleration difference SPKU is greater than the on-ice determining constant HPKU during counting by the on-ice determining timer TMA, i.e., if a greater acceleration is detected over a predetermined time due to the slipping of the driven wheels on the ice having the smaller road surface friction coefficient, the on-ice determining flag F_HYJ is set at "1". By using the on-ice determining timer TMA as described above, an instantaneous slipping produced when the vehicle is jumped or when the vehicle treads on a wet iron plate is not misunderstood as representing a slipping condition on an icy surface.

This will be described with reference to the flow charts. First, the acceleration difference SPKU is calculated at step S35. The detail of the calculation of the acceleration difference SPKU is shown in a subroutine shown in FIG. 5. The calculation of the acceleration difference SPKU is conducted at an interval of 80 ms. If 80 ms has elapsed at step S61, a reference acceleration GGHH generated during traveling of the vehicle at the second shift stage on a flat road is searched at step S62 based on Gmap with the vehicle speed V and the throttle opening degree TH used as parameters. At subsequent step S63, an acceleration ratio GGFH resulting from the division of the reference acceleration during traveling of the vehicle at the second shift stage on the flat road by a reference acceleration during traveling of the vehicle at the first shift stage on the flat road is searched based on a ratio map with the vehicle speed V and the throttle opening degree TH used as parameters. Then, at step S64, a difference HDELVH between the current vehicle speed V and the last vehicle speed V (before 240 ms), namely, an actual acceleration, is calculated.

If the shift stage is not the first shift stage, i.e., if the shift stage is the second shift stage at next step S65, the reference acceleration GGHH searched at step S62 (the reference acceleration generated during traveling of the vehicle at the second shift stage on the flat road) is subtracted from the difference HDELVH (the actual acceleration at the second shift stage) to calculate an acceleration difference SPKU at the second shift stage at step S67. If the shift stage is the first shift stage at step S65, then, at step S66, the difference HDELVH (the actual acceleration at the first shift stage) is multiplied by the acceleration ratio GGFH (the acceleration ratio calculated by dividing the reference acceleration during traveling of the vehicle at the second stage on the flat road by the reference acceleration during traveling of the vehicle at the first shift stage on the flat road) to calculate an actual acceleration HDELVH in terms of a value corresponding to the second shift stage. At step S67, the reference acceleration GGHH is subtracted from the actual acceleration HDELVH calculated in terms of a value corresponding to the second shift stage, thereby calculating an acceleration difference SPKU corresponding to the second shift stage.

When the acceleration difference SPKU has been calculated in the above manner at step S35, it is compared with the on-ice determining constant HPKU at step S36. If the acceleration difference SPKU exceeds the on-ice determining constant HPKU, the processing advances to step S37. If the slip determining flag F_SLIP indicative of the fact that the driven wheels are being slipped is cleared to "0" at step S37, a presumed vehicle speed VYS during slipping of the driven wheels being as an initial value is replaced by a current vehicle speed V (i.e., a vehicle speed $V_0$ at the generation of slipping) at step S38, progressing to step S41. On the other hand, if the slip determining flag F_SLIP has been already set at "1" at step S37, a presumed vehicle speed VYS is calculated at step S40, progressing to step S41. The detail of the calculation of the presumed vehicle speed VYS will be described hereinafter with reference to a subroutine shown in FIG. 6.

If the counting time of the on-ice determining timer TMA is up at subsequent step S41, the slip determining flag F_SLIP is cleared to "0" at step S42. If the shift stage is not a backward shift stage at subsequent step S43, the on-ice determining flag F_HYJ is set at "1" at step S44, based on the determination of the fact that the vehicle is on an icy surface. If the acceleration difference SPKU is equal to or less than the on-ice determining constant HPKU at step S36, the slip determining flag F_SLIP is cleared to "0" at step S45, and the on-ice determining timer TMA is set at step S46.

Figure 8:
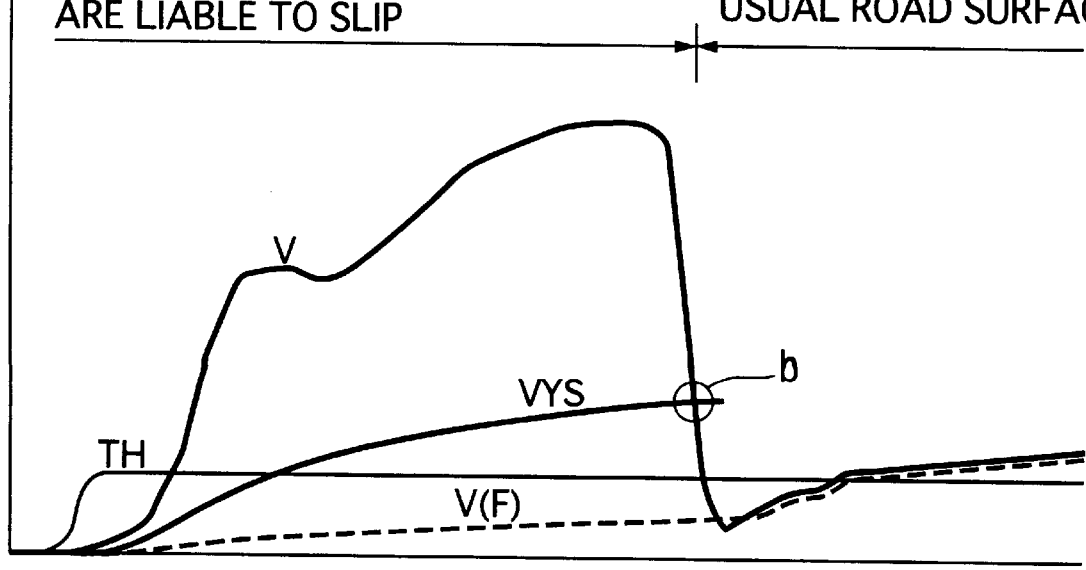
Figure 9:
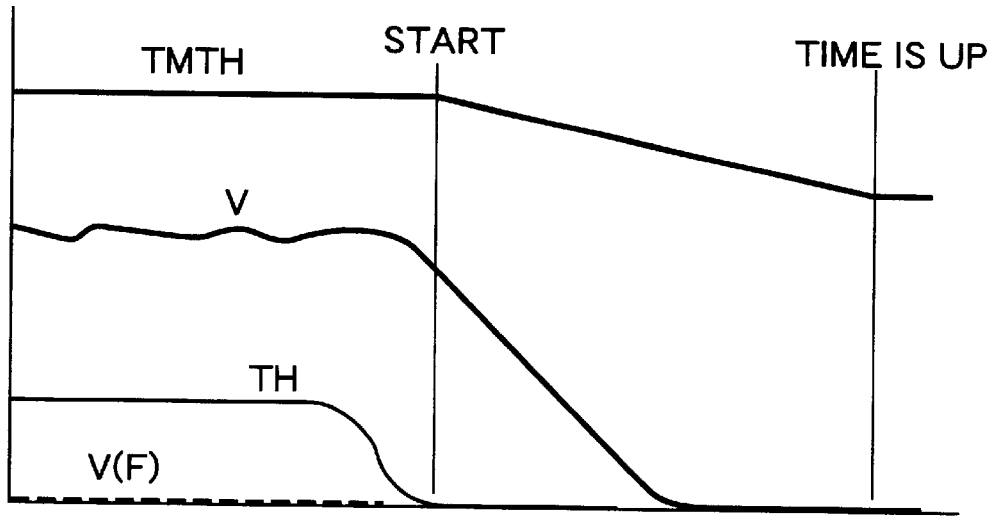
Figure 10:
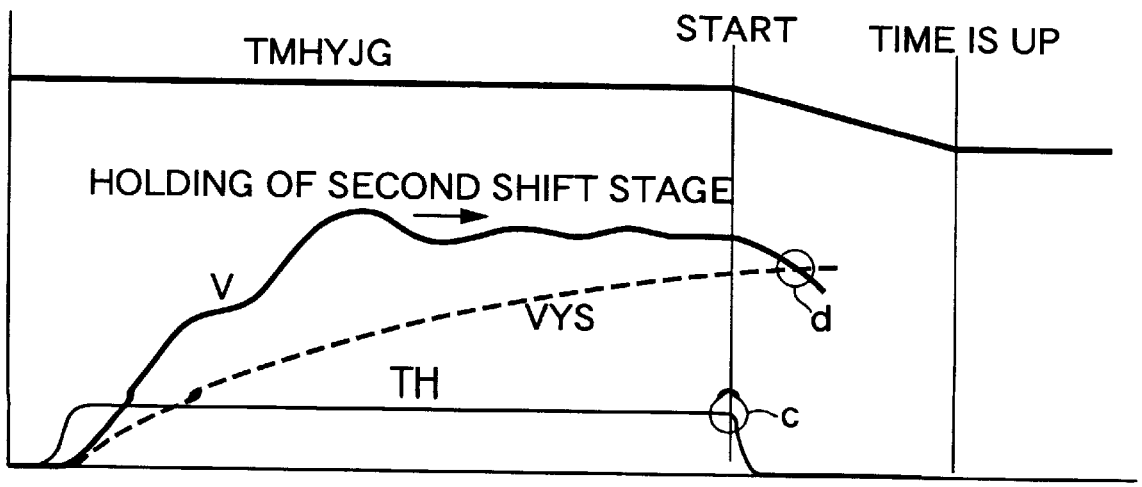
Figure 11:
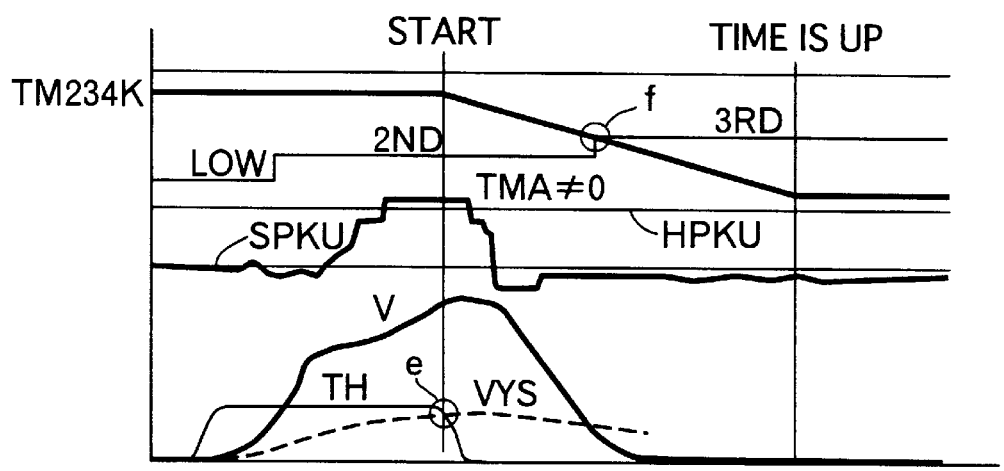

A case where the on-ice determining flag F_HYJ is cleared to "0" based on the determination of the fact that the vehicle has been moved from on an ice onto a normal road surface, will be described first with reference to FIG. 8. If the driven wheels are slipped with the start of the vehicle on an icy surface, the detected vehicle speed V is rapidly increased, but the actual vehicle speed V (F) is increased slowly. An actual vehicle speed V(F) during slipping of the driven wheels cannot be detected and hence, a presumed vehicle speed VYS at the time when the vehicle has been started on a normal flat road is calculated. When the vehicle is moved from the icy surface onto the normal road surface and as a result, the slipping is abated and the detected vehicle speed V is dropped to become equal to or lower than the presumed vehicle speed VYS, i.e., when V≦VYS is established at a point b in FIG. 8, it is determined that the driven wheels have gripped the road surface, whereby the slipping has been eliminated, and the onice determining flag F_HYJ is cleared to "0".

This will be further described with reference to the flow charts. If the on-ice determining flag F_HYJ is set at "1" at step S32, and the throttle opening degree is equal to or larger than a fully-closed throttle opening degree CTH at step S47, the throttle returning timer TMTH is set at step S48, and a presumed vehicle speed VYS is calculated at step S40 according to the same subroutine as at the step S40. If the presumed vehicle speed VYS is equal to or greater than the vehicle speed V at step S50, the on-ice determining flag F_HYJ is cleared to "0" at step S52 based on the determination of the fact that the slipping has been eliminated, and the on-ice determining timer TMA is set at step S53.

When the throttle opening degree is equal to the fully-closed throttle opening degree CTH at step S47, the throttle returning timer TMTH set at step S48 in a last loop starts counting. If a predetermined amount of time (e.g., 2 sec) has elapsed at step S51, the on-ice determining flag F_HYJ is cleared to "0" at step S52. This is because if 2 seconds elapse from the time when the throttle opening degree has become the fully-closed throttle opening degree CTH, the slipping is abated by the reduction of the driving force and hence, it is unnecessary to carry out the holding of the second shift stage.

Now, the calculation of the presumed vehicle speed VYS at steps S40 and S49 will be described with reference to the flow chart in FIG. 6. First, if 240 ms has elapsed at step S71, a reference acceleration GGHH in traveling of the vehicle at the second shift stage on a usual flat road is searched based on Gmap with the presumed vehicle speed VYS and the throttle opening degree TH being used as parameters. If the shift stage is the first shift stage at subsequent step S73, an acceleration ratio GGFH resulting from division of the reference acceleration in traveling of the vehicle at the second shift stage on the flat road by the reference acceleration in traveling of the vehicle at the first shift stage on the flat road is searched at step S74, based on the ratio map with the presumed vehicle speed VYS and the throttle opening degree TH being used as the parameters. If the shift stage is not the first shift stage and is instead the second shift stage at step S73, the acceleration ratio GGFH is set at "1" at step S75.

At step S76, the reference acceleration corresponding to the second shift stage and searched at the step S72 is divided by the acceleration ratio GGFH searched at step S74 to calculate an amount ΔVYS of variation in presumed vehicle speed corresponding to the first gear shift. If the shift stage at this time is the second shift stage, a value resulting from multiplication of the reference acceleration GGHH corresponding to the second gear shift by 1 set at the step S75 is determined as an amount ΔVYS of variation in presumed vehicle speed corresponding to the second gear shift.

If the amount ΔVYS of variation in presumed vehicle speed is positive at subsequent step S77 and the current throttle opening degree TH is equal to or greater than 0.6/8 at step S78, a value resulting from the addition of the amount ΔV of variation in presumed vehicle speed to the presumed vehicle speed VYS is determined as a new presumed vehicle speed VYS at step S79. If the presumed vehicle speed VYS exceeds an upper limit value HVYSH of presumed vehicle speed (e.g., 100 km/h) at step S80, the upper limit value HVYSH of presumed vehicle speed is employed as a presumed vehicle speed VYS at step S81. If the throttle opening degree TH is smaller than 0.6/8 at step S78, the calculation of the presumed vehicle speed VYS at steps S79 to S81 is not carried out. A vehicle speed V at the start of the slipping, namely a vehicle speed $V_0$ (see FIG. 7) which is a vehicle speed V in a moment when the acceleration difference SPKU exceeds the on-ice determining constant HPKU, is employed as an initial value of presumed vehicle speed VYS.

Figure 3A:
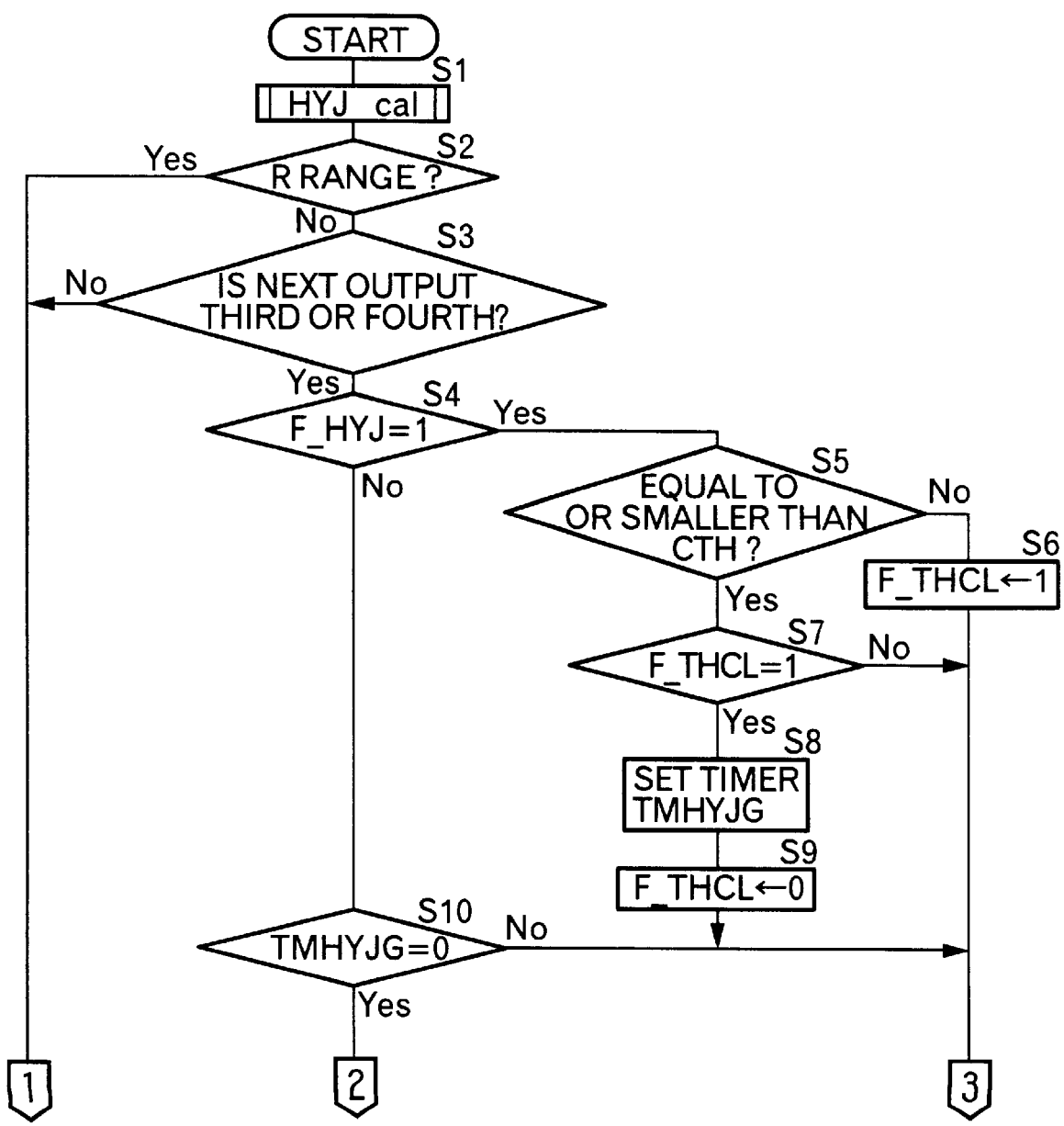
Figure 4:
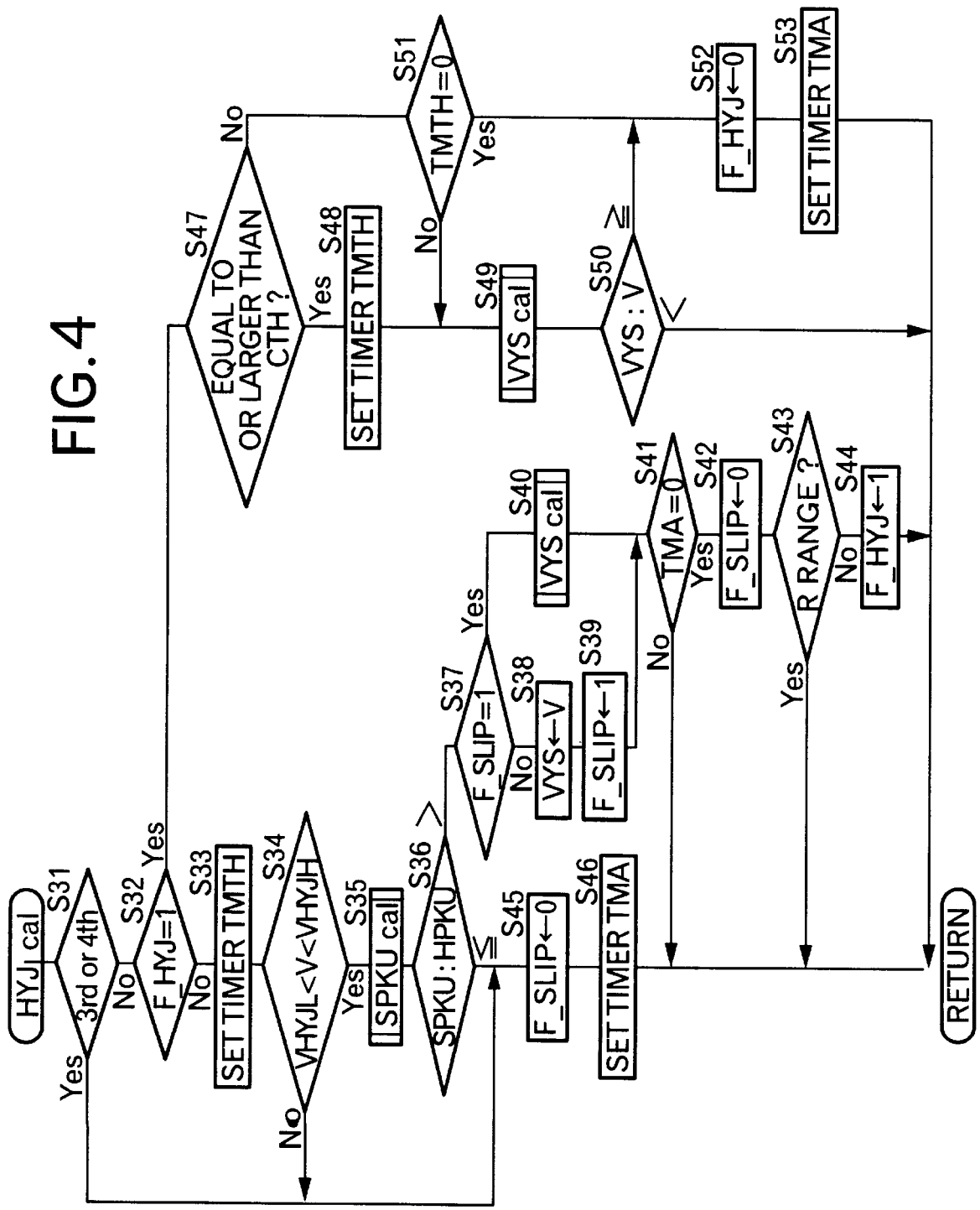

The on-ice determination at step S1 of the main routine shown in FIG. 3A is carried out in the above manner. If the on-ice determining flag F_HYJ is set at "1" or reset at "0" as a result of the on-ice determination, the processing is advanced to step S2. If the shift stage is not the backward shift stage at step S2 and the vehicle is in an operative state to conduct the upshifting and the next output of shifting command is the third or fourth shift stage at step S3, the processing is advanced to step S4.

If the on-ice determining flag F_HYJ is set at "1" at step S4 and the vehicle is on the icy surface having the smaller road surface friction coefficient, the processing is advanced through steps S5 to S9, and the shift stage is held at the second shift stage at step S16 shown in FIG. 3B. This causes the upshifting to the third or fourth shift stage to be inhibited when the vehicle is on the icy surface, thereby avoiding damage to the differential D. This will be described with reference to FIG. 10. When the accelerator pedal is continued to be depressed in a state in which there is a slipping generated at the start of the vehicle on an icy surface, the presumed vehicle speed VYS is gradually increased to approach the vehicle speed V. This causes a problem that when the accelerator pedal is returned at a point c, the vehicle speed V becomes equal to or less than the presumed vehicle speed VYS at a point d, and the holding of the second shift stage is canceled, thereby permitting the upshifting to be conducted. However, the undesirable upshifting can be avoided by inhibiting the canceling of the holding of the second shift stage until the counting time of the second shift stage hold canceling delay timer TMHYJG is up, when the throttle opening degree TH has reached a fully closed value in a state in which the on-ice determining flag F_HYJ has been set at "1".

This will be further described with reference to the flow charts. At steps S5 to S9 shown in FIG. 3A, when the throttle opening degree TH has reached the fully closed value in the state in which the on-ice determining flag F_HYJ has been set at "1", and the second shift stage hold canceling delay timer TMHJG is set. Namely, when the throttle opening degree TH is not the fully closed value at step S5, the fully-closed throttle determining flag F_THCL is previously set at "1" at step S6. If the fully-closed throttle determining flag F_THCL is equal to "1" when the throttle opening degree TH has reached the fully closed value at step S5, namely, at the moment when the throttle opening degree TH has reached the fully closed value, the second shift stage hold canceling delay timer TMHYJG is set at step S8, and the fully-closed throttle determining flag F_THCL is cleared to "0" at step S9.

When the on-ice determining flag F_HYJ has been cleared to "0" at step S4 by the elimination of the slipping, the shift stage is held at the second shift stage until the counting time of the second shift stage hold canceling delay timer TMHYJG is up at step S10 after the elapse of, for example, 1 sec and hence, the upshifting to the third shift stage is inhibited until the one second has elapsed.

Now, the on-ice determination is still not conducted at step S4 and therefore, in a state in which the on-ice determining flag F_HYJ has been cleared to "0", there is a possibility that the undesirable upshifting may be conducted, when the accelerator pedal has been returned on an ice. More specifically, when the throttle opening degree TH is decreased at a point e, before the counting time of the on-ice determining timer TMA is up, after the acceleration difference SPKU exceeds the on-ice determining constant HPKU in FIG. 11 with starting of the vehicle on the ice and after the on-ice determining timer TMA starts to count the time, the undesirable upshifting is generated at a point f. Thereupon, the counting by the second shift stage (before on-ice determination) holding timer TM234K is started simultaneously with the decreasing of the throttle opening degree TH, and the upshifting is inhibited until the counting time of the second shift stage (before on-ice determination) holding timer TM234K is up.

This will be further described below with reference to the flow charts. If the acceleration difference SPKU is equal to or less than the on-ice determining constant HPKU at step S12 with no slipping generated, or if the returned amount of the throttle opening degree TH is smaller (e.g., equal to or smaller than an opening degree of ⅜, at step S13 in a state in which the on-ice determining flag F_HYJ has been cleared to "0" at step S4; the counting time of the second shift stage hold canceling delay timer TMHYJG has been up at step S10; and a second shift stage hold (out of on ice) determining flag F SECHLD which will be described hereinafter has been cleared to "0" at step S11, the holding of the second shift stage at step S16 is not carried out by returning the processing through steps S17 and S18.

However, if the acceleration difference SPKU exceeds the on-ice determining constant HPKU at step S13 to generate a slipping and the returned mount of the throttle opening degree TH is larger at the step S14, then the shift stage is held at the second shift stage at step S16, until the counting time of the second shift stage (before the on-ice determination) holding timer TM234K is up at step S15, after the second shift stage hold (out of on ice) determining flag F_SECHLD has been set at "1" at step S14.

In a next loop, the second shift stage hold (out of on ice) determining flag F_SECHLD has been already set at "1" at step S11 and hence, the processing is advanced to step S19. In a state in which the acceleration difference SPKU has exceeded the on-ice determining constant HPKU at step S19 and the returned amount of the throttle opening degree TH is larger at step S20, the second shift stage (before the on-ice determination) holding timer TM234K is set every time at step S21. If the acceleration difference SPKU is equal to or less than the on-ice determining constant HPKU at step S19, or the returned amount of the throttle opening degree TH is less at step S20, the second shift stage (before the on-ice determination) holding timer TM234K starts to count the time at step S15. If the counting time of the second shift stage (before the on-ice determination) holding timer TM234K is up, the processing is advanced to step S18, at which the second shift stage hold (out of on ice) determining flag F_SECHLD is cleared to "0", and the holding of the second shift stage is canceled.

Figure 12:
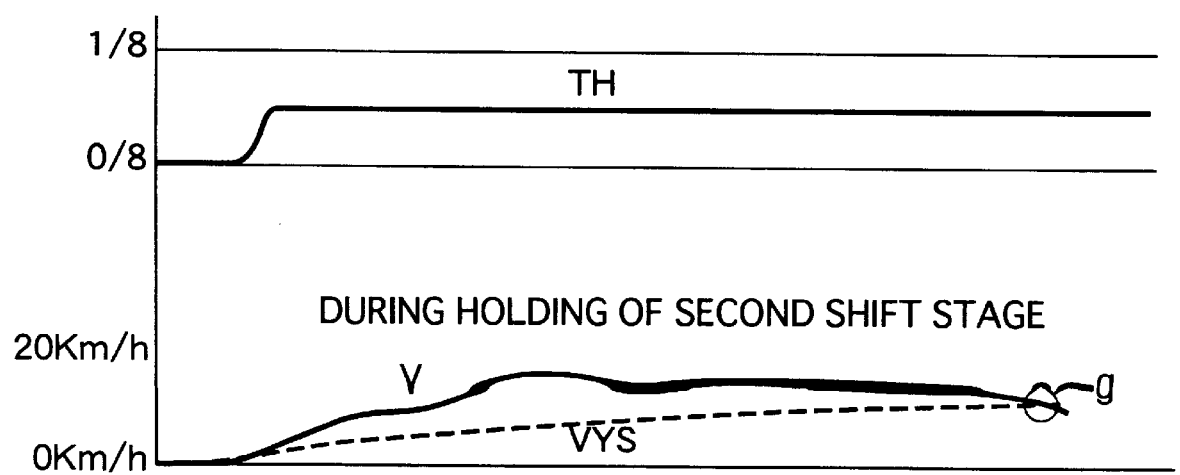
Figure 13:
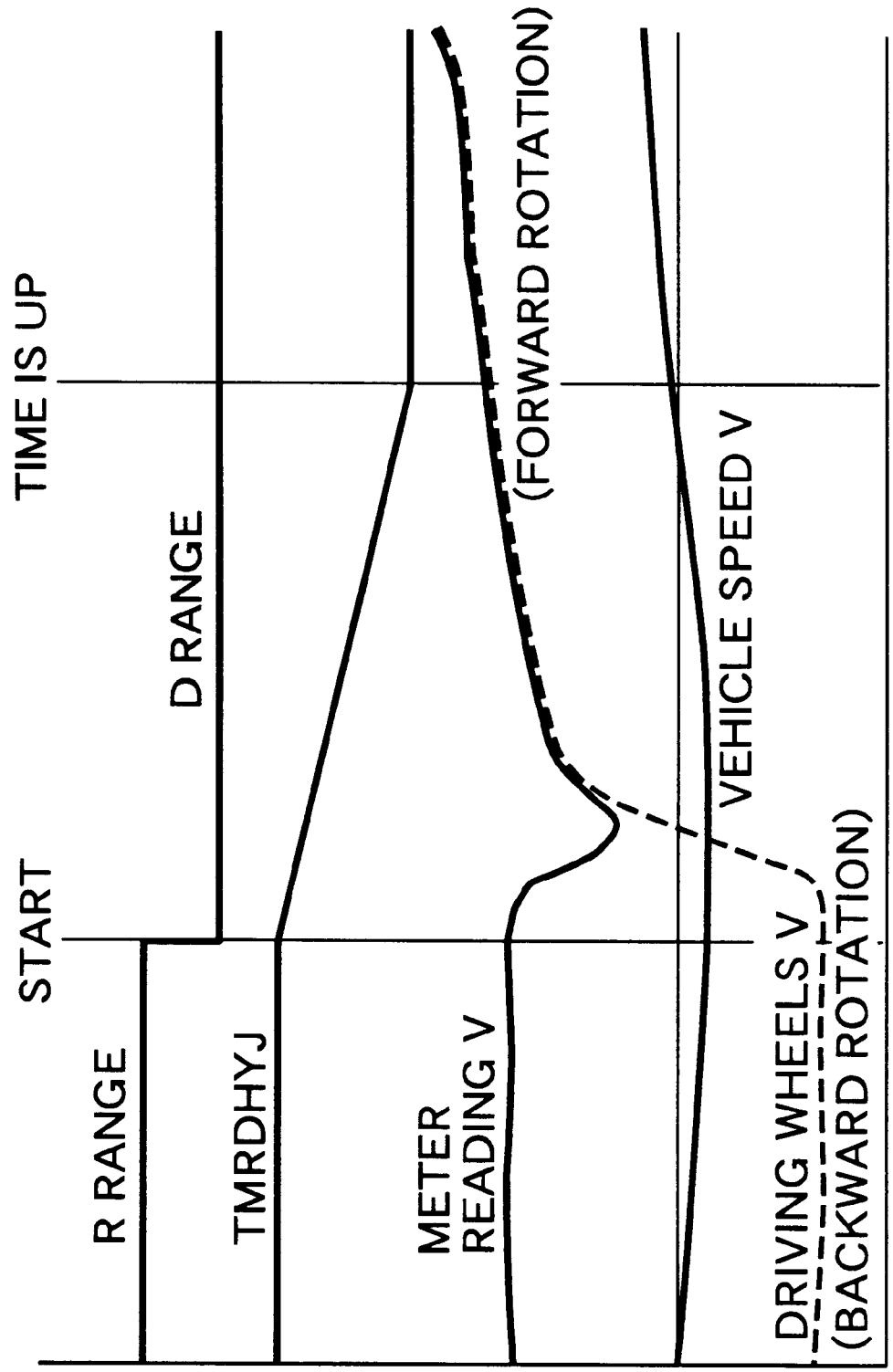

At a throttle opening degree equal to or less than ⅛, there is no significant difference between the acceleration on an icy surface and the acceleration on a normal road surface. For this reason, as shown in FIG. 12 a line of the vehicle speed V and a line of the presumed vehicle speed value VYS approach each other and intersect each other at a point g and thus, the undesirable canceling of the holding of the second shift stage may be produced in some cases. Thereupon, when the throttle opening degree TH is a value less than 0.6/8, the calculation of the presumed vehicle speed VYS is not carried out, as described at step S78 of the flow chart shown in FIG. 6, and the presumed vehicle speed VYS is fixed to a value $V_0$ which is a vehicle speed at the start of slipping, thereby making it possible to avoid the undesirable upshifting.

The vehicle speed sensor $S_1$ for detecting the vehicle speed V based on the number of rotations of the rotary member of the automatic transmission T is incapable of discriminating the rotational direction of the rotary member (namely, whether the vehicle is traveling forwards or backwards). For this reason, if the gear shift is changed from an R range to a D range in a state in which the vehicle is traveling backwards at a high speed, there is a possibility that the first shift stage is not established, and the third or fourth shift stage may be established. Therefore, a third/fourth shift stage prohibiting timer TMRDHYJ is started when the gear shift is changed from the R range to the D range, thereby prohibiting the upshifting to the third or fourth shift stage for a predetermined time (e.g., 2 sec).

Although the embodiment of the present invention has been described in detail, it will be understood that the present invention is not limited to the above-described embodiment, and various modifications in design may be made without departing from the spirit and scope of the invention defined in claims.

For example, in place of the throttle opening degree TH, an accelerator opening degree, which is an amount of accelerator pedal operated, may be employed.

Figure 5:
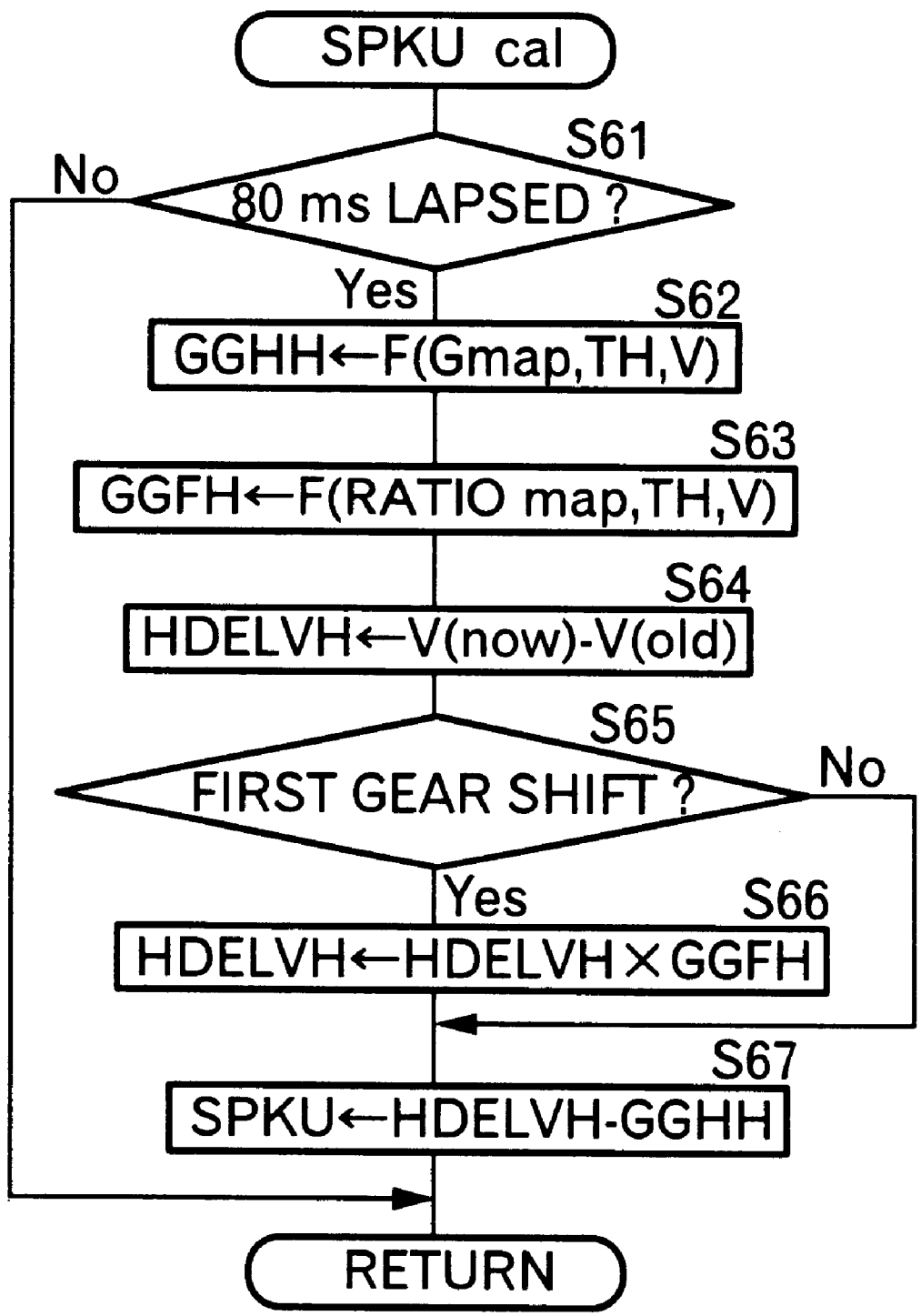
Figure 6:
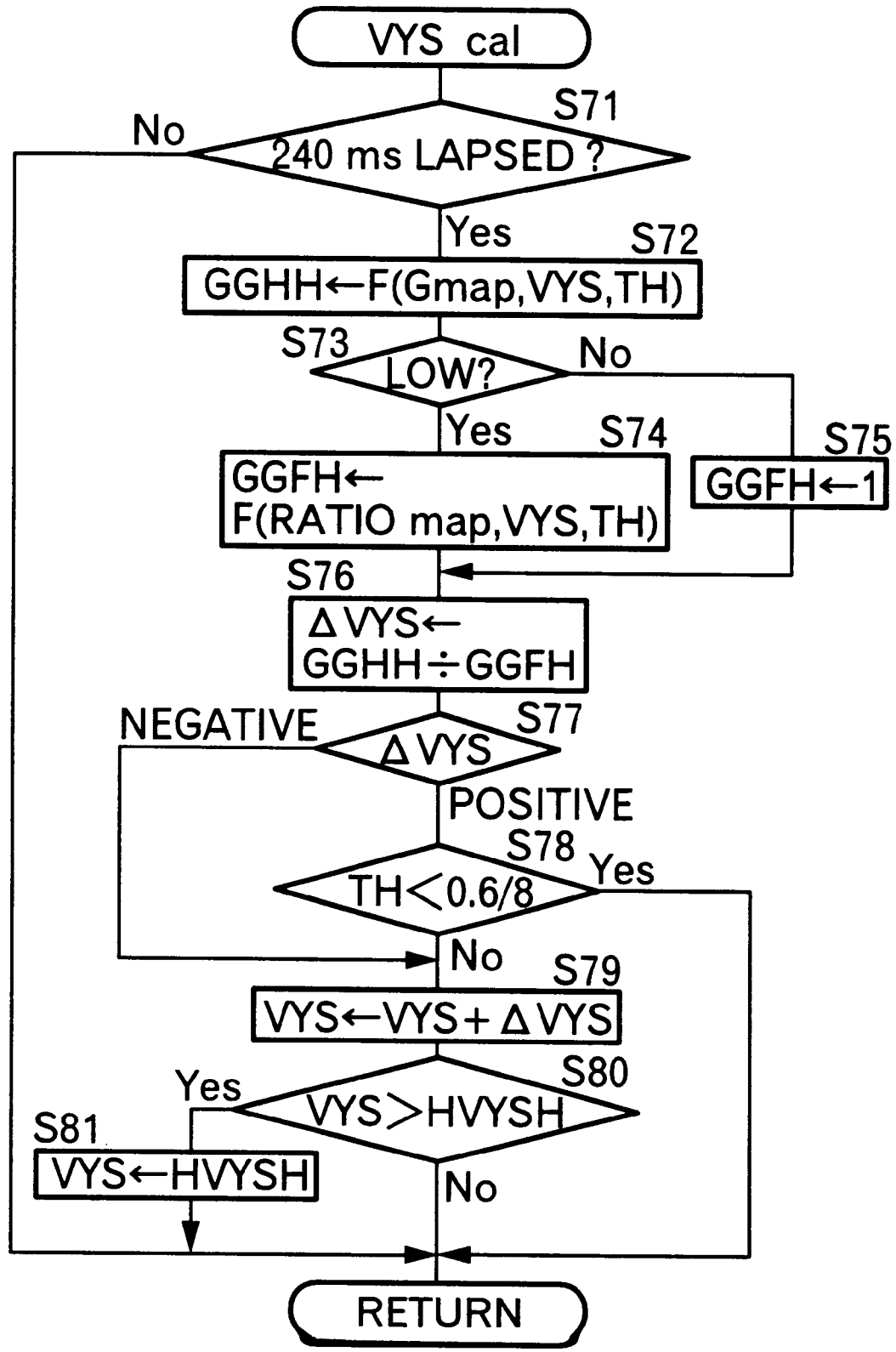

In the flow charts shown in FIGS. 5 and 6, the ratio map has been used for the calculation of the acceleration difference SPKU or the presumed vehicle speed, but if a G map orresponding to each shift stage is used, the ratio map is not equired.

To calculate a presumed vehicle speed VYS, a torque transmitted to a road surface may be calculated in consideration of a torque amplifying effect provided by slipping of the torque converter of the automatic transmission T, and the presumed vehicle speed VYS may be corrected based on such transmitted torque. This makes it possible to perform a control with greater accuracy.

The present embodiment is not applied to a case in which when the gear shift has been changed to the forward traveling range such as an N range or the D range in a state in which the number of revolutions of the engine is higher than a number of idle revolutions, a shifting-shock alleviating control (an in-gear squat control) is carried out by establishing the first shift stage after establishment of the third shift stage for a moment. Namely, the upshifting to the third shift stage by the in-gear squat control is carried out as usual.

What is claimed is:

1. A control system for an automatic transmission (T) for a vehicle, comprising a shift control means (M1) for changing a shift stage of the automatic transmission (T) in accordance with an operational state of the vehicle;

a vehicle speed detecting means ($S_1$) for detecting a vehicle speed (V) based on a rotational speed of a rotary member of said automatic transmission (T);

a slipped-state determining means (M2) for determining a slipped state of the vehicle based on a rate of variation in vehicle speed (V) detected by said vehicle speed detecting means ($S_1$); and a shift prohibiting means (M3) for prohibiting the shifting of said automatic transmission (T) by said shift control means (M1) when the slipped state is determined by said slipped-state determining means (M2), wherein said control system further includes:

a vehicle acceleration (during traveling on flat road) calculating means (M4) for calculating a vehicle acceleration on a flat road from a throttle opening degree or an accelerator opening degree and the vehicle speed (V) calculated by said vehicle speed calculating means ($S_1$) at a shift stage at the time point when the slipped state is determined by said slipped-state determining means (M2);

an elapsed-time measuring means (M5) for measuring a time elapsing from the time point when the slipped state is determined by said slipped-state determining means (M2);

a presumed-vehicle speed calculating means (M6) for calculating a presumed vehicle speed (VYS) from (1) an amount ($\Delta$VYS) of variation in vehicle speed which corresponds to an elapsed time measured by said elapsed-time measuring means (M5) and which is calculated from the vehicle speed calculated by said vehicle acceleration (during traveling on flat road) calculating means (M4) and said elapsed time, and (2) a vehicle speed (V) at the time point when the slipped state is determined by said slipped-state determining means (M1);

a slipped-state elimination determining means (M7) for determining the elimination of the slipped state by comparing the vehicle speed (V) detected by said vehicle speed detecting means ($S_1$) with the presumed vehicle speed (VYS) calculated by said presumed vehicle speed calculating means (M6); and a shift prohibition canceling means (M8) for canceling the prohibition of the shifting by said shift prohibiting means (M3), when the elimination of the slipped state is determined by said slipped-state elimination determining means.

2. A control system for an automatic transmission for a vehicle according to claim 1, wherein when the throttle opening degree (TH) or the accelerator opening degree is decreased to a closed value for a predetermined time (TMTH), said shift prohibition canceling means (M8) cancels the prohibition of the shifting.

3. A control system for an automatic transmission for a vehicle according to claim 1, wherein when the throttle opening degree (TH) or the accelerator opening degree is decreased to a closed value before determination of the slipped state of the vehicle by said slipped-state determining means (M2), said shift prohibiting means (M3) prohibits the shifting for a predetermined time (TM234K) from such time point.

4. A control system for an automatic transmission for a vehicle according to claim 1, wherein when the throttle opening degree (TH) or the accelerator opening degree is decreased to the closed value during prohibition of the shifting, said shift prohibiting means (M3) continues the prohibition of the shifting for a predetermined time (TMHYJG) from such time point.

5. A control system for an automatic transmission for a vehicle according to claim 1, wherein when the throttle opening degree (TH) or the accelerator opening degree is maintained at a value equal to or less than a predetermined opening degree during prohibition of the shifting, said presumed vehicle speed calculating means (M6) corrects the presumed vehicle speed (VYS).

* * * * *